United States Patent [19]

Walther

[11] 4,162,105
[45] Jul. 24, 1979

[54] BASE FLANGED TIRE CARRYING RIMS, WHEELS AND FASTENING ASSEMBLIES

[75] Inventor: William D. Walther, Kettering, Ohio

[73] Assignee: Dayton Walther Corporation, Dayton, Ohio

[21] Appl. No.: 810,297

[22] Filed: Jun. 27, 1977

Related U.S. Application Data

[63] Continuation-in-part of Ser. No. 749,243, Dec. 13, 1976, Pat. No. 4,129,336, which is a continuation-in-part of Ser. No. 592,502, Jul. 9, 1975, abandoned.

[51] Int. Cl.² ............................................ B60B 23/10
[52] U.S. Cl. ............................ 301/12 R; 301/13 SM
[58] Field of Search ............... 301/10 R, 11 R, 12 R, 301/11 S, 13 R, 13 SM, 18-20, 22, 96-97

[56] References Cited

U.S. PATENT DOCUMENTS

| 1,293,283 | 2/1919 | Wolfe | 301/11 R |
| 1,924,970 | 8/1933 | Ash | 301/19 X |
| 1,947,911 | 2/1934 | Kay | 301/13 R X |
| 2,209,030 | 7/1940 | MacDonald | 301/11 R |
| 3,893,688 | 7/1975 | DeRegnaucourt | 301/11 R X |

FOREIGN PATENT DOCUMENTS 687658  4/1930  France ..................... 301/12 R

Primary Examiner—Robert J. Spar
Assistant Examiner—Charles A. Marmor

Attorney, Agent, or Firm—Mack D. Cook, II

[57] ABSTRACT

Base flanged tire carrying rims are locked by fastening assemblies on the spoke members of a vehicle wheel. The rim mounting flanges project radially from a base portion between dual bead flanges and have a medial portion with a radially inclined surface and an axially oriented surface and a radially directed leg portion. FIGS. 1-3 disclose an outer dual rim mounting on a wheel feeloe comprising a radially directed surface and an adjacent radially inner lateral surface using a fastening assembly having a clamp element with dual concentric and segmental axially oriented surfaces and parallel radially directed surfaces. FIGS. 4 and 5 disclose an outer dual rim mounting on a wheel felloe comprising wing portions providing a pair of axially oriented surfaces and a radially directed surface between the wing portions using a fastening assembly having a clamp element with lateral wing portions and parallel radially directed surfaces. FIG. 6 discloses an outer dual rim mounting on the wheel felloe of FIG. 1 using a fastening assembly having a clamp element with dual segmental radially inclined and axially oriented surfaces and parallel radially directed surfaces. FIG. 7 discloses an outer dual rim mounting on a wheel felloe comprising a radially directed surface using a fastening assembly having a clamp element with a segmental radially inclined surface and parallel radially directed surfaces.

6 Claims, 6 Drawing Figures

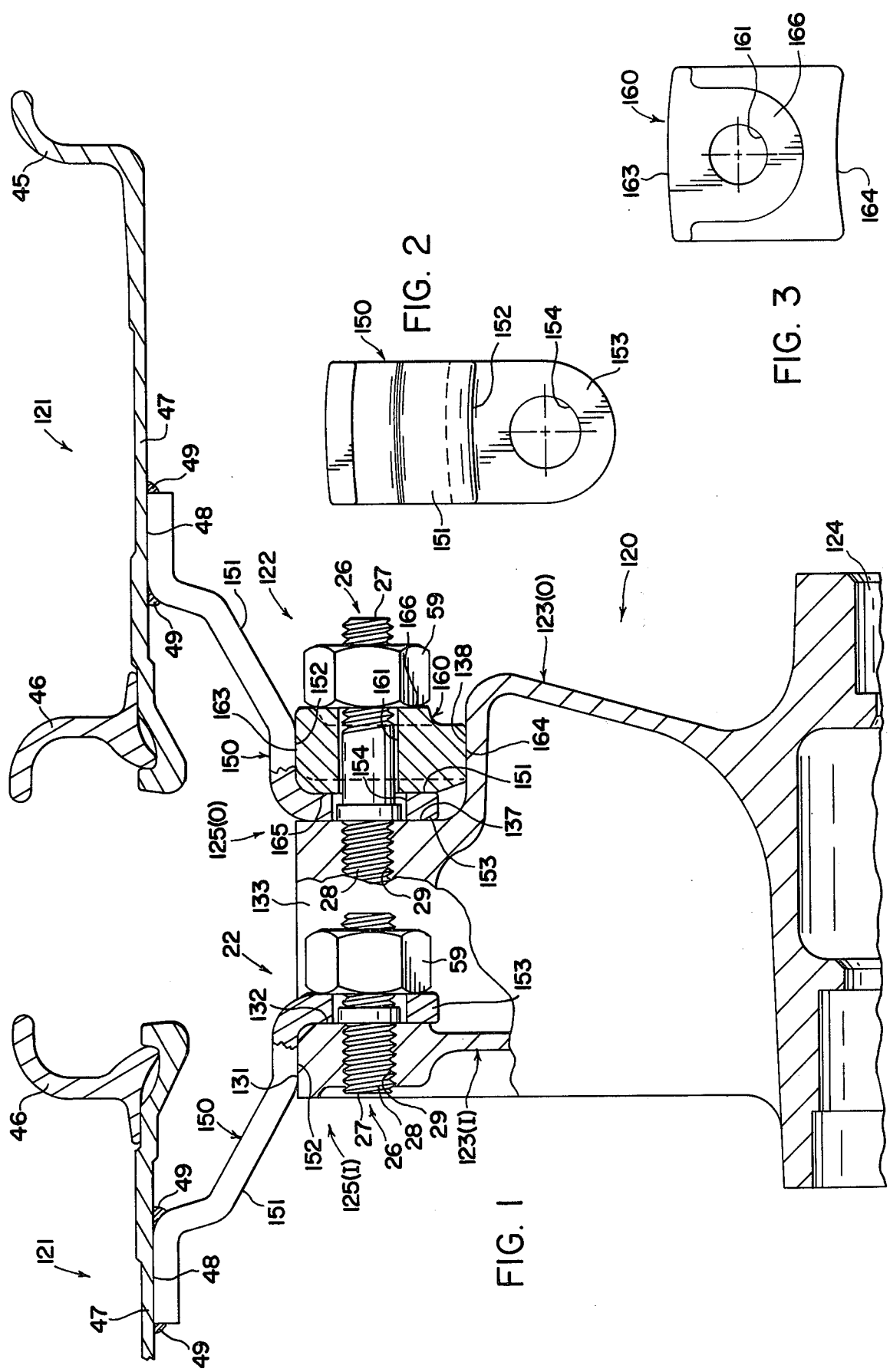

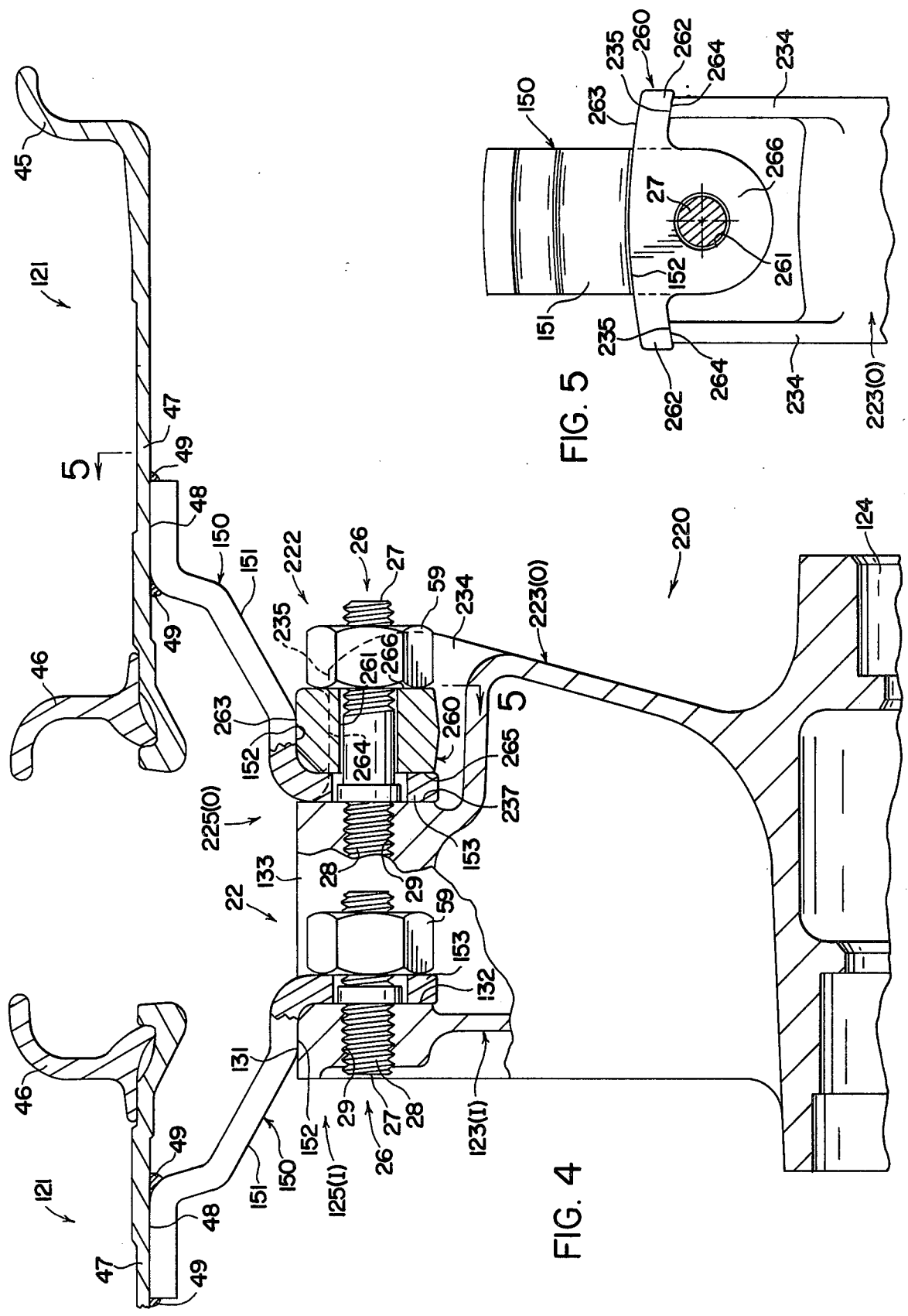

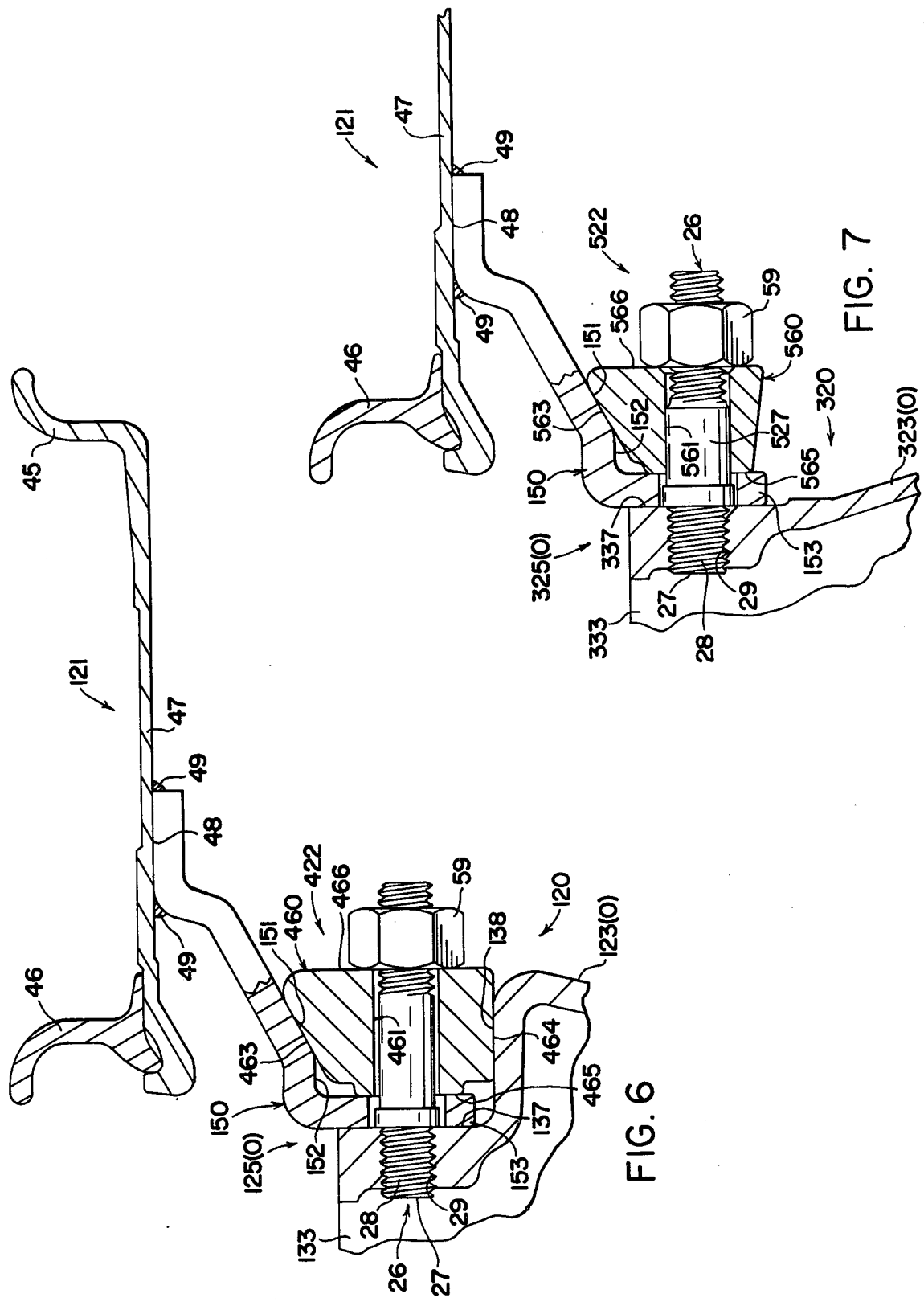

BASE FLANGED TIRE CARRYING RIMS, WHEELS AND FASTENING ASSEMBLIES

BACKGROUND OF THE INVENTION

This application is a continuation-in-part of U.S. application Ser. No. 749,243, filed Dec. 13, 1976, now U.S. Pat. No. 4,129,336; which was a continuation-in-part of U.S. application Ser. No. 592,502, filed July 9, 1975, now abandoned.

The present invention relates to a combination of a tire carrying rim seated and locked by fastening assemblies on a vehicle wheel. A combination of dual inner and outer tire carrying rims may be mounted on a vehicle wheel without using a separating means, such as an annular spacer.

Prior art patents particularly relevant to rims, wheels and fastening assemblies according to the invention include references cited during the pendency of U.S. application Ser. No. 592,502. Other prior art relating to tire carrying rims demountably carried on vehicle wheels includes patents to be found in Class 301 beginning with Subclass 10R. Other relevant patents may be found in Class 152, Subclasses 406X et seq.

The accurate mounting of tire carrying rims on the felloe, felly or load-bearing portion of a wheel has long been a problem in the art. Vehicle operators and industry regulations seek longer tire life and complete safety in operation, even under the most severe of vehicle operating conditions. The tire manufacturers are endeavoring to provide tires which have optimum performance characteristics, including lateral and radial balance. Consequently, it is being required that this art provide elements, the wheels, the rims, and fastening assemblies therefor, which do not deteriorate, hinder or impair the projected performance characteristics of the tires.

Heretofore, the spoked wheel structure of a tire-rim-wheel assembly has been regarded primarily as a load carrying element attached to an axle of the vehicle and carrying the rim. The periphery of the wheel had felly surfaces to pilot or guide the rim into approximate mounting position. Thereafter, fastening assemblies were torqued down or tightened in such a manner that the tire carrying rim would not come loose from the wheel during use. If done correctly, as by an expert and conscientious mechanic, the prior art rim mounting techniques would not deteriorate, hinder or impair the performance characteristics of the tires. However, environmental or extrinsic factors such as warpage, deformation or damage to the rim and spacer or wear of the fastening assemblies could lead to relative displacement or non-alignment of the assembly components during fastening, creating conditions of what are now commonly referred to as excessive lateral (axial) or radial runout or an imbalance of the tire-rim-wheel assembly during vehicle operation.

This application, and the referenced prior application, provide the art with various embodiments of base flanged rims and fastening assemblies therefor which, when used with the wheel adapted thereto, positively control and reduce lateral (axial) and radial runout, resist rim warpage and deformation, restrict or lock out the possibility of rim rotation relative to the wheel and provide better balance for the tire-rim-wheel assembly during vehicle operation.

This application, and the referenced prior application, also provide the art with complete interchangeability of a particular rim embodiment with a dual wheel adapted thereto. So long as the wheels and a particular rim embodiment are matched according to the subject matter disclosure, a rim can be used as either an inner or outer dual.

The referenced prior application discloses wheels with radially inclined inner dual wheel felloe surfaces. It has now been found that the same improved results can be achieved without the use of radially inclined wheel felloe surfaces while maintaining the advantages of complete rim interchangeability, for use as either an inner or outer dual. This improved subject matter concept permits the use of a lighter weight, less expensive wheel and is thought to be particularly efficient or effective when relatively light mounting flanges attached to the rim base edge portion are piloted by axially oriented wheel felloe surfaces or axially oriented fastening assembly surfaces during tightening of the fastening assemblies and mating engagement with mounting surfaces. As a result, this application discloses various embodiments of middle range tire-rim-wheel assemblies useful in light or medium duty vehicle applications.

SUMMARY OF THE INVENTION

The object of the invention is to provide an improved combination of a tire carrying rim seated and locked by fastening assemblies on a vehicle wheel.

It is a further object of the invention to provide tire carrying rims, interchangeble for use as an inner or outer dual, having base attached mounting flanges or adaptors seated or locked on wheels adapted thereto having dimensioned felloe surfaces and by coacting fastening assemblies.

It is a further object of the invention to provide interchangeable base flanged tire carrying rims which can be seated and locked by fastening assemblies on a vehicle wheel without the use of radially inclined wheel felloe surfaces.

These and other objects of the invention, as well as the advantages thereof, will be apparent in view of the detailed description thereof as set forth below.

In all embodiments disclosed herein, the wheel spoke members each have felloes comprising a radially inwardly directed surface substantially perpendicular to the rotational axis of the wheel and providing a mounting location for an axially projecting component of the fastening assemblies.

In the FIGS. 1 and 4 embodiments, the inner dual wheel spoke members also have felloes with a radially outer axially oriented surface for piloting of conforming clamp lug lateral surfaces.

In the FIGS. 1 and 6 embodiments, the outer dual spoke members also have felloes with a radially inner axially oriented lateral surface for piloting of conforming fastening assembly clamp element surfaces. In the FIG. 4 embodiment, the outer dual spoke members have spaced-apart axially projecting wing portions providing for a pair of axially oriented felloe surfaces.

In both embodiments disclosed herein, the tire carrying rims have radially outwardly projecting bead flanges and radially inwardly projecting mounting flanges. Each mounting flange has a radially outer portion integrally attached to a conforming annular surface on a base portion of the rim between the bead flanges. Each mounting flange further has a medial portion comprising a radially inclined axially inner surface intersecting an axially oriented radially inner surface.

Each mounting flange still further has a radially inwardly directed terminal or leg portion adjacent an axially oriented surface and oriented substantially perpendicular to the rotational axis of the rim having a bore therein for receiving the axially projecting component of the fastening assemblies.

Each mounting flange leg portion has a bore with an effective diameter greater than the effective diameter of the axially projecting component of the fastening assemblies.

In all embodiments disclosed herein, the fastening assemblies for use in mounting a tire carrying rim on an inner dual wheel comprise an axially projecting component and a rotatable nut carried thereon for bearing engagement against the axially outer face of a clamp lug leg portion.

The fastening assemblies for use in mounting a tire carrying rim on an outer dual wheel comprise an axially projecting component and a clamp element and a rotatable nut carried thereon. Each clamp element has a bore therein for receiving the axially projecting component of the fastening assemblies. In the FIGS. 1, 4 and 6 embodiments, the clamp element bore has an effective diameter greater than the effective diameter of the axially projecting component. In the FIG. 7 embodiment, the clamp element bore has an effective diameter coincident with the effective diameter of a medial portion on the axially projecting component.

The clamp element of the FIG. 1 embodiment has dual concentric and segmental axially movable axially oriented surfaces and parallel axially movable radially directed surfaces.

The clamp element of the FIG. 4 embodiment has lateral wing portions with a segmental radially outer axially oriented surface and providing for radially inwardly facing dual axially oriented surfaces. This clamp element embodiment also has parallel axially movable radially directed surfaces.

The clamp element of the FIG. 6 embodiment has dual segmental axially movable surfaces; a radially outer radially inclined surface and a radially inner axially oriented surface. This clamp element embodiment also has parallel axially movable radially directed surfaces.

The clamp element of the FIG. 7 embodiment has a segmental axially movable radially outer radially inclined surface and parallel axially movable radially directed surfaces.

In general, the tire carrying rims are seated on, and thereafter locked on, a wheel by initial and final tightening of the fastening assemblies against each clamp lug leg portion.

In the FIG. 1 and FIG. 4 embodiments, initial tightening of the fastening assemblies will seat the axially oriented mounting flange surfaces on each rim in concentric radial registry with conforming axially oriented surfaces. In both the FIGS. 6 and 7 embodiments, initial tightening of the fastening assemblies will seat the radially inclined mounting flange surfaces in concentric registry with conforming radially inclined clamp element surfaces.

In all embodiments, final tightening of the fastening assemblies to apply a load will lock the rim on the wheel, in lateral (axial) and radial alignment and registry relative to the rotational axis of rim and wheel, by the full surface engagement of the clamp lug leg portions with the radially directed wheel felloe surfaces.

DESCRIPTION OF THE DRAWINGS

FIG. 1 is a sectional view of one embodiment of a dual wheel with interchangeable inner and outer tire carrying rims and fastening assemblies according to the invention;

FIG. 2 is a plan view of a mounting flange used on the rims of FIG. 1;

FIG. 3 is a plan view of a clamp element used in the fastening assemblies of FIG. 1;

FIG. 4 is a sectional view of another embodiment of a dual wheel with interchangeable inner and outer tire carrying rims and fastening assemblies according to the invention;

FIG. 5 is a plan view taken substantially as indicated on line 5—5 of FIG. 4;

FIG. 6 is a fragmentary sectional view of another embodiment of the outer spoke of a dual wheel with an outer tire carrying rim and fastening assembly according to the invention; and FIG. 7 is a fragmentary sectional view of another embodiment of the outer spoke of a dual wheel with an outer tire carrying rim and fastening assembly according to the invention.

DETAILED DESCRIPTION OF THE INVENTION

FIGS. 1–3 Embodiment

In the FIGS. 1–3 embodiment, a wheel is indicated generally by the numeral 120, the dual inner and outer carrying rims are indicated generally by the numeral 121, the inner rim fastening assemblies are indicated generally by the numeral 22 and the outer rim fastening assemblies are indicated generally by the numeral 122.

A dual wheel 120 has a plurality of alternating inner and outer spoke members, 123(I) and 123(O), with an axially spaced-apart and staggered relation to an adjacent spoke member. Each spoke member extends radially from a conventional hub area 124 and terminates in a felloe portion. The inner felloes are referred to generally by the numeral 125(I); the outer felloes are referred to generally by the numeral 125(O).

Each wheel felloe 125(I) and 125(O) has a predetermined mounting location indicated generally at 26 for the axially projecting component of a fastening assembly 22 or 122. As shown, the axially projecting component of a fastening assembly 22 or 122 is a stud 27 having an inner end with peripheral threads 28 for mating engagement with bore threads 29. Alternatively, the studs 27 may be attached at the mounting locations 26, as by conventional arc stud or capacitor discharge welds.

Each inner felloe 125(I) on a dual wheel 120 comprises a radially outer axially oriented surface 131 and an adjacent radially inwardly directed surface 132. Each surface 131 is substantially parallel to the rotational axis of a wheel 120. Each surface 132 has a mounting location 26 for the axially projecting component of a fastening assembly 22 and is substantially perpendicular to the rotational axis of a wheel 120. Each felloe 125(I) is preferably interconnected with an adjacent outer felloe 125(O) by web portions 133 which may be extended radially toward the hub area 124 of a wheel 120 for purposes of styling or aesthetic design or improving mechanical strength.

Each outer felloe 125(O) on a dual wheel 120 comprises a radially inwardly directed surface 137 and an adjacent radially inner axially oriented lateral surface 138. Each surface 137 is preferably coterminous with the axially outer face of the web portions 133, has a mounting location 26 for the axially projecting component of a fastening assembly 122 and is substantially perpendicular to the rotational axis of a wheel 120. Each lateral surface 138 is substantially parallel to the rotational axis of a wheel 120.

As shown, a tire carrying rim 121 has dual bead flanges 45 and 46 for seating the beads (not shown) of a tire in a conventional manner. The bead flanges are radially outwardly directed from an annular rim base or medial portion 47. The medial rim base portion has a conforming annular surface 48 for integral attachment thereto, as by welds 49, of the radially outer or end portion of a plurality of radially inwardly projecting mounting or adaptor flanges referred to generally by the numeral 150.

Each mounting flange 150 has a medial or body portion comprising a radially inclined axially inner surface 151 intersecting an axially oriented radially inner surface 152.

Each mounting flange 150 also has a radially inwardly directed terminal or leg portion 153 adjacent an axially oriented surface 152. Each flange portion 153 is oriented substantially perpendicular to the rotational axis of a rim 121 and has a bore 154 therein for receiving the axially projecting component of a fastening assembly 22 or 122. Each bore 154 has an effective diameter greater or larger than the effective diameter of the axially projecting component of a fastening assembly 22 or 122.

The fastening assemblies 22 have a rotatable nut 59 carried on the stud 27 for use in mounting a rim 121 on the wheel felloes 125(I). When the rim mounting flanges 150 are seated and locked on the felloes 125(I), after tightening of the rotatable nuts 59 against the leg portions 153, the axially oriented surfaces 152 will be in mating engagement with the felloe surfaces 131 and the leg portions 153 will be in mating engagement with the radially inwardly directed felloe surfaces 132.

The fastening assemblies 122 have a rotatable nut 59 and an axially movable clamp element, referred to generally by the numeral 160, carried on the stud 27 for use in mounting a rim 121 on the wheel felloes 125(O). A clamp element 160 has a bore 161 for receiving the stud 27. Each bore 161 has an effective diameter greater or larger than the effective diameter of the stud 27.

A clamp element 160 has dual concentric and segmental axially movable surfaces; a radially outer axially oriented surface 163 and a radially inner axially oriented surface 164. Both surfaces 163 and 164 are substantially parallel to the rotational axis of a wheel 120 or rim 121. A clamp element 160 also has dual and parallel axially movable surfaces; an axially inner radially directed surface 165 and an axially outer radially directed surface 166. Both surfaces 165 and 166 are substantially perpendicular to the rotational axis of a wheel 120 or rim 121.

When the mounting flanges 150 are seated and locked on the felloes 125(O), after tightening of the rotatable nuts 59 against the clamp element surfaces 166, the clamp element surfaces 165 will be in mating engagement with the leg portions 153, the clamp element surfaces 164 will be in mating engagement with the wheel felloe surfaces 138, and the clamp element surfaces 163 will be in mating engagement with the axially oriented surfaces 152.

As shown, the wheel 120 is a dual wheel for mounting interchangeable inner and outer rims 121. However, the inner felloes 125(I) could be embodied in a single wheel for mounting a single rim 121 using the fastening assemblies 22.

As shown, the mounting flanges 150 are a series of individual elements. Alternatively, a mounting flange 150 may be an annular or substantially circumferentially continuous element having the radially inwardly projecting leg portions 153 thereon at spaced intervals conforming to the location of the fastening assemblies 22 or 122.

FIGS. 4 & 5 Embodiment

In the FIGS. 4 & 5 embodiment, a wheel is indicated generally by the numeral 220, the dual inner and outer carrying rims are indicated generally by the numeral 121, the inner rim fastening assemblies are indicated generally by the numeral 22 and the outer rim fastening assemblies are indicated generally by the numeral 222.

A dual wheel 220 has a plurality of alternating inner and outer spoke members, 123(I) and 223(O), with an axially spaced-apart and staggered relation to an adjacent spoke member. Each spoke member extends radially from a conventional hub area 124 and terminates in a felloe portion. The inner felloes are referred to generally by the numeral 125(I); the outer felloes are referred to generally by the numeral 225(O).

Each wheel felloe 125(I) and 225(O) has a predetermined mounting location indicated generally at 26 for the axially projecting component of a fastening assembly 22 or 222. As shown, the axially projecting component of a fastening assembly 22 or 222 is a stud 27 having an inner end with peripheral threads 28 for mating engagement with bore threads 29. Alternatively, the studs 27 may be attached at the mounting locations 26, as by conventional arc stud or capacitor discharge welds.

Each inner felloe 125(I) on a dual wheel 220 comprises a radially outer axially oriented surface 131 and an adjacent radially inwardly directed surface 132. Each surface 131 is substantially parallel to the rotational axis of a wheel 220. Each surface 132 has a mounting location 26 for the axially projecting component of a fastening assembly 22 and is substantially perpendicular to the rotational axis of a wheel 220. Each felloe 125(I) is preferably interconnected with an adjacent outer felloe 225(O) by web portions 133 which may be extended radially toward the hub area 124 of a wheel 220 for purposes of styling or aesthetic design or improving mechanical strength.

Each outer felloe 225(O) on a dual wheel 220 has spaced-apart axially projecting wing portions 234. The axial wing portions 234 provide for a pair of axially oriented surfaces 235. The wing portions 234 may be extended radially toward the hub area 124 of a wheel 220 for purposes of styling or aesthetic design or improving mechanical strength. Each surface 235 is substantially parallel to the rotational axis of a wheel 220.

Each felloe 225(O) also has a radially inwardly directed surface 237 extending transversely of and between the pair of axially oriented surfaces 235. Each surface 237 is preferably coterminous with the axially outer face of the web portions 133, has a mounting location 26 for the axially projecting component of a fastening assembly 222 and is substantially perpendicular to the rotational axis of a wheel 220.

FIG. 4 shows dual rims 121, as more fully described, supra, with reference to FIG. 1.

The fastening assemblies 222 have a rotatable nut 59 and an axially movable, generally T-shaped clamp element, referred to generally by the numeral 260, carried on the stud 27 for use in mounting a rim 221 on the wheel felloes 225(O). A clamp element 260 has a bore 261 for receiving the stud 27. Each bore 261 has an effective diameter greater or larger than the effective diameter of the stud 27.

A clamp element 260 also has lateral wing portions 262, with a radially outer axially oriented surface 263, and providing for radially inwardly facing dual axially oriented surfaces 264. The three axially movable surfaces 263 and 264 are concentric and segmental and substantially parallel to the rotational axis of a wheel 220 or rim 221. A clamp element 260 also has dual and parallel axially movable surfaces; an axially inner radially directed surface 265 and an axially outer radially directed surface 266. Both surfaces 265 and 266 are substantially perpendicular to the rotational axis of a wheel 220 or rim 221.

When the mounting flanges 150 are seated and locked on the felloes 225(O), after tightening of the rotatable nuts 59 against the clamp element surfaces 266, the clamp element surfaces 265 will be in mating engagement with the leg portions 153, the clamp elements surfaces 264 will be in mating engagement with the wheel felloe surfaces 235, and the clamp lug surfaces 263 will be in mating engagement with the axially oriented surfaces 152.

FIG. 6 Embodiment

In the FIG. 6 embodiment, the wheel is indicated generally by the numeral 120, the outer tire carrying rim is indicated generally by the numeral 121, and the outer rim fastening assemblies are indicated generally by the numeral 422.

FIG. 6 shows the outer spoke member and felloe of a wheel 120, as more fully described, supra, with reference to FIG. 1.

FIG. 6 shows an outer rim 121, as more fully described, supra, with reference to FIG. 1. In the rim 121 of FIG. 6, the axial extent of the axially oriented radially inner surface 152 may be less than as shown in FIG. 1.

The fastening assemblies 422 have a rotatable nut 59 and an axially movable clamp element, referred to generally by the numeral 460, carried on the stud 27 for use in mounting a rim 121 on the wheel felloes 125(O). A clamp element 460 has a bore 461 for receiving the stud 27. Each bore 461 has an effective diameter greater or larger than the effective diameter of the stud 27.

A clamp element 460 has dual segmental axially movable surfaces; a radially outer radially inclined surface 463 and a radially inner axially oriented surface 464. Surface 463 has a suitable angle relative to the rotational axis of a rim 121 to provide a conical surface for mating engagement with a mounting flange surface 151. Surface 464 is substantially parallel to the rotational axis of a wheel 120 or a rim 121. A clamp element 460 also has dual and parallel axially movable surfaces; an axially inner radially directed surface 465 and an axially outer radially directed surface 466. Both surfaces 465 and 466 are substantially perpendicular to the rotational axis of a wheel 120 or rim 121.

When the mounting flanges 150 are seated and locked on the felloes 125(O), after tightening of the rotatable nuts 59 against the clamp element surfaces 466, the clamp element surfaces 465 will be in mating engagement with the leg portions 153, the clamp element surfaces 464 will be in mating engagement with the wheel felloe surfaces 138, and the clamp element surfaces 463 will be in mating engagement with the radially inclined mounting flange surfaces 151.

FIG. 7 Embodiment

In the FIG. 7 embodiment, the wheel is referred to generally by the numeral 320, the outer tire carrying rim is referred to generally by the numeral 121, and the outer rim fastening assemblies are indicated generally by the numeral 522.

FIG. 7 shows the outer spoke member and felloe of a wheel 320, as more fully described, supra, with reference to FIG. 6.

FIG. 7 shows a rim 121, as more fully described, supra, with reference to FIG. 1. In the rim 121 of FIG. 7, the axial extent of the axially oriented radially inner surface 152 may be less than as shown in FIG. 1.

The fastening assemblies 522 have a rotatable nut 59 and an axially movable clamp element, referred to generally by the numeral 560, carried on the stud 27 for use in mounting a rim 121 on the wheel felloes 325(O). The stud 27 is provided with a medial portion 527 having an effective diameter coincident with, substantially the same as, the effective diameter of a clamp element bore 561 so that during tightening of the rotatable nut 59, the clamp element 560 will be in sliding and radially registered engagement with the shank portion 527.

A clamp element 560 has a segmental axially movable radially outer radially inclined surface 563. Surface 563 has a suitable angle relative to the rotational axis of a rim 121 to provide a conical surface for mating engagement with a mounting flange surface 151. A clamp element 560 also has dual and parallel axially movable surfaces; an axially inner radially directed surface 565 and an axially outer radially directed surface 566. Both surfaces 565 and 566 are substantially perpendicular to the rotational axis of a wheel 320 or rim 121.

When the mounting flanges 150 are seated and locked on the felloes 325(O), after tightening of the rotatable nuts 59 against the clamp element surfaces 566, the clamp element surfaces 565 will be in mating engagement with the leg portions 153 and the clamp element surfaces 563 will be in mating engagement with the radially inclined mounting flange surfaces 151.

What is claimed is:

1. A combination of dual inner and outer tire carrying rims seated and locked by inner and outer rim fastening assemblies on a vehicle wheel,
    said wheel (120) having a plurality of inner and outer spoke members, each of said inner spoke members having a felloe comprising a radially outer axially oriented surface (131) substantially parallel to the rotational axis of said wheel and an adjacent radially inwardly directed surface (132) substantially perpendicular to the rotational axis of said wheel and providing a mounting location for an axially projecting component of said fastening assemblies, each of said outer spoke members having a felloe comprising a radially inwardly directed surface (137) substantially perpendicular to the rotational axis of said wheel and providing a mounting location for an axially projecting component of said fastening assemblies and an adjacent radially inner axially oriented lateral surface (138) substantially parallel to the rotational axis of said wheel, each of said rims (121) having radially outwardly projecting bead flanges and radially inwardly projecting mounting flanges, each of said mounting flanges (150) having a radially outer portion integrally attached to a conforming annular surface on a base portion of said rim between said bead flanges, each said mounting flange further having a medial portion comprising an axially oriented radially inner surface (152), each said mounting flange still further having a radially inwardly directed leg portion (153) adjacent said axially oriented surface and oriented substantially perpendicular to the rotational axis of said rim and having a bore therein for receiving said axially projecting component of said fastening assemblies, said bore having an effective diameter greater than the effective diameter of an axially projecting component of said fastening assemblies, each said outer rim fastening assembly (122) comprising said axially projecting component and a clamp element (160) and a rotatable nut (59) carried thereon, said clamp element having a bore (161) therein for receiving said axially projecting component, said bore having an effective diameter greater than the effective diameter of said axially projecting component, each said clamp element further having dual concentric and segmental axially movable axially oriented surfaces; a radially outer surface (163) and a radially inner surface (164), each said clamp element still further having parallel axially movable radially directed surfaces; an axially inner surface (165) and an axially outer surface (166), whereby, said inner rim is seated on, and thereafter locked on, said wheel by initial and final tightening of said inner rim fastening assemblies against each said mounting flange leg portion, said initial tightening of said inner rim fastening assemblies seating said axially oriented mounting flange surfaces (152) in concentric registry with said axially oriented wheel felloe surfaces (131); said final tightening of said inner rim fastening assemblies locking said rim on said wheel by the full surface engagement of said mounting flange leg portions (153) with said radially inwardly directed wheel felloe surfaces (132), and, whereby, said outer rim is seated on, and thereafter locked on, said wheel by initial and final tightening of said outer rim fastening assemblies, said initial tightening of said rotatable nuts (59) against said axially outer clamp element surfaces (166) seating said axially oriented mounting flange surfaces (152) in concentric registry with said radially outer clamp element surfaces (163) and seating said radially inner clamp element surfaces (164) in concentric registry with said radially inner axially oriented wheel felloe surfaces (138); said final tightening of said rotatable nuts (59) against said axially outer clamp element surfaces (166) locking said rim on said wheel by the full surface engagement of said axially inner clamp element surfaces (165) with said mounting flange leg portions (153) and by the full surface engagement of said mounting flange leg portions (153) with said radially inwardly directed wheel felloe surfaces (137).

2. A combination of dual inner and outer tire carrying rims mounted on a vehicle wheel, said outer rim being seated and locked on said wheel by fastening assemblies, said wheel (120) having a plurality of inner and outer spoke members, each of said outer spoke members having a felloe comprising a radially inwardly directed surface (137) substantially perpendicular to the rotational axis of said wheel and providing a mounting location for an axially projecting component of said fastening assemblies and an adjacent radially inner axially oriented lateral surface (138) substantially parallel to the rotational axis of said wheel, each of said rims (121) having radially outwardly projecting bead flanges and radially inwardly projecting mounting flanges, each of said mounting flanges (150) having a radially outer portion integrally attached to a conforming annular surface on a base portion of said rim between said bead flanges, each said mounting flange further having a medial portion comprising an axially oriented radially inner surface (152), each said mounting flange still further having a radially inwardly directed leg portion (153) adjacent said axially oriented surface and oriented substantially perpendicular to the rotational axis of said rim and having a bore therein for receiving said axially projecting component of said fastening assemblies, said bore having an effective diameter greater than the effective diameter of an axially projecting component of said fastening assemblies, each said fastening assembly (122) comprising said axially projecting component and a clamp element (160) and a rotatable nut (59) carried thereon, said clamp element having a bore (161) therein for receiving said axially projecting component, said bore having an effective diameter greater than the effective diameter of said axially projecting component, each said clamp element further having dual concentric and segmental axially movable axially oriented surfaces; a radially outer surface (163) and a radially inner surface (164), each said clamp element still further having parallel axially movable radially directed surfaces; an axially inner surface (165) and an axially outer surface (166), whereby, said outer rim is seated on, and thereafter locked on, said wheel by initial and final tightening of said outer rim fastening assemblies, said initial tightening of said rotatable nuts (59) against said axially outer clamp element surfaces (166) seating said axially oriented mounting flange surfaces (152) in concentric registry with said radially outer clamp element surfaces (163) and seating said radially inner clamp element surfaces (164) in concentric registry with said radially inner axially oriented wheel felloe surfaces (138); said final tightening of said rotatable nuts (59) against said axially outer clamp element surfaces (166) locking said rim on said wheel by the full surface engagement of said axially inner clamp element surfaces (165) with said mounting flange leg portions (153) and by the full surface engagement of said mounting flange leg portions (153) with said radially inwardly directed wheel felloe surfaces (137).

3. A combination of dual inner and outer tire carrying rims seated and locked by fastening assemblies on a vehicle wheel, said wheel (220) having a plurality of inner and outer spoke members, each of said inner spoke members having a felloe comprising a radially outer axially oriented surface (131) substantially parallel to the rotational axis of said wheel and an adjacent radially inwardly directed surface (132) substantially perpendicular to the rotational axis of said wheel and providing a mounting location for an axially projecting component of said fastening assemblies, each of said outer spoke members having a felloe comprising spaced-apart axially projecting wing portions (234) providing for a pair of axially oriented surfaces (235) substantially parallel to the rotational axis of said wheel and a radially directed surface (237) extending inwardly between said axially oriented surfaces substantially perpendicular to the rotational axis of said wheel and providing a mounting location for an axially projecting component of said fastening assemblies, each of said rims (121) having radially outwardly projecting bead flanges and radially inwardly projecting mounting flanges, each of said mounting flanges (150) having a radially outer portion integrally attached to a conforming annular surface on a base portion of said rim between said bead flanges, each said mounting flange further having a medial portion comprising an axially oriented radially inner surface (152), each said mounting flange still further having a radially inwardly directed leg portion (153) adjacent said axially oriented surface and oriented substantially perpendicular to the rotational axis of said rim and having a bore therein for receiving said axially projecting component of said fastening assemblies, said bore having an effective diameter greater than the effective diameter of an axially projecting component of said fastening assemblies, each said outer rim fastening assembly (222) comprising said axially projecting component and a clamp element (260) and a rotatable nut (59) carried thereon, said clamp element having a bore therein for receiving said axially projecting component, said bore having an effective diameter greater than the effective diameter of said axially projecting component, each said clamp element further having lateral wing portions (262) with a segmental radially outer axially oriented surface (263) and providing for radially inwardly facing dual axially oriented surfaces (264), each said clamp element still further having parallel axially movable radially directed surfaces, an axially inner surface (265) and an axially outer surface (266), whereby, said inner rim is seated on, and thereafter locked on, said wheel by initial and final tightening of said inner rim fastening assemblies against each said mounting flange leg portion, said initial tightening of said inner rim fastening assemblies seating said axially oriented mounting flange surfaces (152) in concentric registry with said axially oriented wheel felloe surfaces (131); said final tightening of said inner rim fastening assemblies locking said rim on said wheel by the full surface engagement of said mounting flange leg portions (153) with said radially inwardly directed wheel felloe surfaces (132), and, whereby, said outer rim is seated on, and thereafter locked on, said wheel by initial and final tightening of said outer rim fastening assemblies, said initial tightening of said rotatable nuts (59) against said axially outer clamp element surfaces (266) seating said axially oriented mounting flange surfaces (152) in concentric registry with said radially outer clamp element surfaces (263) and seating said dual axially oriented clamp element surfaces (264) in concentric registry with said axially oriented wheel felloe surfaces (235); said final tightening of said rotatable nuts (59) against said axially outer clamp element surfaces (266) locking said rim on said wheel by the full surface engagement of said axially inner clamp element surfaces (265) with said mounting flange leg portions (153) and by the full surface engagement of said mounting flange leg portions (153) with said radially inwardly directed wheel felloe surfaces (237).

4. A combination of dual inner and outer tire carrying rims mounted on a vehicle wheel, said outer rim being seated and locked by fastening assemblies, said wheel (220) having a plurality of inner and outer spoke members, each of said outer spoke members having a felloe comprising spaced-apart axially projecting wing portions (234) providing for a pair of axially oriented surfaces (235) substantially parallel to the rotational axis of said wheel and a radially directed surface (237) extending inwardly between said axially oriented surfaces substantially perpendicular to the rotational axis of said wheel and providing a mounting location for an axially projecting component of said fastening assemblies, each of said rims (121) having radially inwardly projecting bead flanges and radially inwardly projecting mounting flanges, each of said mounting flanges (150) having a radially outer portion integrally attached to a conforming annular surface on a base portion of said rim between said bead flanges, each said mounting flange further having a medial portion comprising an axially oriented radially inner surface (152), each said mounting flange still further having a radially inwardly directed leg portion (153) adjacent said axially oriented surface and oriented substantially perpendicular to the rotational axis of said rim and having a bore therein for receiving said axially projecting component of said fastening assemblies, said bore having an effective diameter greater than the effective diameter of an axially projecting component of said fastening assemblies, each said fastening assembly (222) comprising said axially projecting component and a clamp element (260) and a rotatable nut (59) carried thereon, said clamp element having a bore therein for receiving said axially projecting component, said bore having an effective diameter greater than the effective diameter of said axially projecting component, each said clamp element further having lateral wing portions (262) with a segmental radially outer axially oriented surface (263) and providing for radially inwardly facing dual axially oriented surfaces (264), each said clamp element still further having parallel axially movable radially directed surfaces; an axially inner surface (265) and an axially outer surface (266), whereby, said outer rim is seated on, and thereafter locked on, said wheel by initial and final tightening of said outer rim fastening assemblies, said initial tightening of said rotatable nuts (59) against said axially outer clamp element surfaces (266) seating said axially oriented mounting flange surfaces (152) in concentric registry with said radially outer clamp element surfaces (263) and seating said dual axially oriented clamp element surfaces (264) in concentric registry with said axially oriented wheel felloe surfaces (235); said final tightening of said rotatable nuts (59) against said axially outer clamp element surfaces (266) locking said rim on said wheel by the full surface engagement of said axially inner clamp element surfaces (265) with said mounting flange leg portions (153) and by the full surface engagement of said mounting flange leg portions (153) with said radially inwardly directed wheel felloe surfaces (237).

5. A combination of dual inner and outer tire carrying rims mounted on a vehicle wheel, said outer rim being seated and locked on said wheel by fastening assemblies, said wheel (120) having a plurality of inner and outer spoke members, each of said outer spoke members having a felloe comprising a radially inwardly directed surface (137) substantially perpendicular to the rotational axis of said wheel and providing a mounting location for an axially projecting component of said fastening assemblies and an adjacent radially inner axially oriented lateral surface (138) substantially parallel to the rotational axis of said wheel, each of said rims (121) having radially outwardly projecting bead flanges and radially inwardly projecting mounting flanges, each of said mounting flanges (150) having a radially outer portion integrally attached to a conforming annular surface on a base portion of said rim between said bead flanges, each said mounting flange further having a medial portion comprising a radially inclined axially inner surface (151) intersecting an axially oriented radially inner surface (152), each said mounting flange still further having a radially inwardly directed leg portion (153) adjacent said axially oriented surface and oriented substantially perpendicular to the rotational axis of said rim and having a bore therein for receiving said axially projecting component of said fastening assemblies, said bore having an effective diameter greater than the effective diameter of an axially projecting component of said fastening assemblies, each said fastening assembly (422) comprising said axially projecting component and a clamp element (460) and a rotatable nut (59) carried thereon, said clamp element having a bore (461) therein for receiving said axially projecting component, said bore having an effective diameter greater than the effective diameter of said axially projecting component, each said clamp element further having dual segmental axially movable surfaces; a radially outer radially inclined surface (463) and a radially inner axially oriented surface (464), each said clamp element still further having parallel axially movable radially directed surfaces; an axially inner surface (465) and an axially outer surface (466), whereby, said outer rim is seated on, and thereafter locked on, said wheel by initial and final tightening of said outer rim fastening assemblies, said initial tightening of said rotatable nuts (59) against said axially outer clamp element surfaces (166) seating said radially inclined mounting flange surfaces (151) in concentric registry with said radially outer clamp element surfaces (463) and seating said radially inner clamp element surfaces (464) in concentric registry with said radially inner axially oriented wheel felloe surfaces (138); said final tightening of said rotatable nuts (59) against said axially outer clamp element surfaces (466) locking said rim on said wheel by the full surface engagement of said axially inner clamp element surfaces (465) with said mounting flange leg portions (153) and by the full surface engagement of said mounting flange leg portions (153) with said radially inwardly directed wheel felloe surfaces (137).

6. A combination of dual inner and outer tire carrying rims mounted on a vehicle wheel, said outer rim being seated and locked on said wheel by fastening assemblies, said wheel (320) having a plurality of inner and outer spoke members, each of said outer spoke members having a felloe comprising a radially inwardly directed surface (337) substantially perpendicular to the rotational axis of said wheel and providing a mounting location for an axially projecting component of said fastening assemblies, each of said rims (121) having radially outwardly projecting bead flanges and radially inwardly projecting mounting flanges, each of said mounting flanges (150) having a radially outer portion integrally attached to a conforming annular surface on a base portion of said rim between said bead flanges, each said mounting flange further having a medial portion comprising a radially inclined axially inner surface (151) intersecting an axially oriented radially inner surface (152), each said mounting flange still further having a radially inwardly directed leg portion (153) adjacent said axially oriented surface and oriented substantially perpendicular to the rotational axis of said rim and having a bore therein for receiving said axially projecting component of said fastening assemblies, said bore having an effective diameter greater than the effective diameter of an axially projecting component of said fastening assemblies, each said fastening assembly (522) comprising said axially projecting component and a clamp element (560) and a rotatable nut (59) carried thereon, said clamp element having a bore (561) therein with a diameter coincident with the diameter of a medial portion (527) on said axially projecting component for sliding and radially registered engagement therewith, each said clamp element further having a segmental axially movable radially outer radially inclined surface (563) and parallel axially movable radially directed surfaces; an axially inner surface (565) and an axially outer surface (566), whereby, said outer rim is seated on, and thereafter locked on, said wheel by initial and final tightening of said outer rim fastening assemblies, said initial tightening of said rotatable nuts (59) against said axially outer clamp elements (566) seating said radially inclined mounting flange surfaces (151) in concentric registry with said radially outer clamp element surfaces (563); said final tightening of said rotatable nuts (59) against said axially outer clamp element surfaces (566) locking said rim on said wheel by the full surface engagement of said axially inner clamp element surfaces (565) with said mounting flange leg portions (153) and by the full surface engagement of said mounting flange leg portions (153) with said radially inwardly directed wheel felloe surfaces (337).

* * * * *